United States Patent [19]
Reele et al.

[11] Patent Number: 5,893,037
[45] Date of Patent: Apr. 6, 1999

[54] COMBINED ELECTRONIC/SILVER-HALIDE IMAGE CAPTURE SYSTEM WITH CELLULAR TRANSMISSION CAPABILITY

[75] Inventors: Samuel Reele, Rochester; Alan L. Korus, Fairport, both of N.Y.

[73] Assignee: Eastman Kodak Company, Rochester, N.Y.

[21] Appl. No.: 739,237

[22] Filed: Oct. 29, 1996

Related U.S. Application Data

[63] Continuation of Ser. No. 353,023, Dec. 9, 1994, abandoned.

[51] Int. Cl.⁶ .............................. H04Q 7/32; H04N 7/18
[52] U.S. Cl. ........................ 455/556; 455/557; 348/14; 348/64
[58] Field of Search ................ 348/14, 219, 64; 455/557, 556; 358/527

[56] References Cited

U.S. PATENT DOCUMENTS

| | | | |
|---|---|---|---|
| 4,258,387 | 3/1981 | Lemelson et al. | 358/85 |
| 4,825,457 | 4/1989 | Lebowitz | 379/40 |
| 4,870,686 | 9/1989 | Gerson et al. | 381/43 |
| 4,884,132 | 11/1989 | Morris et al. | 358/93 |
| 5,008,924 | 4/1991 | Guichard et al. | 379/53 |
| 5,027,149 | 6/1991 | Hoshino et al. | 354/412 |
| 5,032,918 | 7/1991 | Ota et al. | 358/209 |
| 5,036,390 | 7/1991 | Masunaga | 358/85 |
| 5,042,082 | 8/1991 | Dahlin | 455/33.1 |
| 5,124,915 | 6/1992 | Krenzel | 364/420 |
| 5,191,601 | 3/1993 | Ida et al. | 379/53 |
| 5,194,955 | 3/1993 | Yoneta et al. | 358/209 |
| 5,212,628 | 5/1993 | Bradbury | 361/683 |
| 5,231,501 | 7/1993 | Sakai | 358/209 |
| 5,392,223 | 2/1995 | Caci | 364/514 |
| 5,396,269 | 3/1995 | Gotoh et al. | 348/14 |
| 5,402,171 | 3/1995 | Tagami et al. | 348/219 |
| 5,717,454 | 2/1998 | Adolphi et al. | 348/64 |

OTHER PUBLICATIONS

Patent Abstracts of Japan, vol. 18, No. 675, Grp. E1648, Dec. 20, 1994, for JP 6–268582 (Kawazu et al), Sep.22, 1994.

Popular Science, Tokyo Motor Show, Hydrogen Rotary Engine, Feb. 1992, p. 14.

Qualcomm Incorporated, "CD–7000 CDMA Digital Portable Phone", Jan. 1993.

*Primary Examiner*—Andrew M. Dolinar
*Attorney, Agent, or Firm*—Thomas H. Close

[57] ABSTRACT

A combined electronic/silver-halide image capture system is capable of transmitting electronic image data using conventional cellular telephone transmission technology. The system includes a camera unit and a cellular telephone that can be electrically coupled to the camera unit. The camera unit has both a photographic film plane and an electronic image sensor. A mechanism is provided for directing scene light from a scene to be imaged to at least one of the photographic film plane and the electronic image sensor, wherein the electronic image sensor generates analog image signals in response to incident scene light. A processing unit receives the analog image signals generated by the electronic image sensor and generates digital image signals represented of the scene to be imaged. A memory unit is provided to selectively store the digital image signals generated by the processing unit. The camera unit also preferably includes a display so that the digital image signals generated by the processing means can be viewed by the operator of the system. The digital image signals are supplied to a cellular telephone which transmits the digital image signals to a remote location when the camera unit is electrically coupled to the cellular telephone.

26 Claims, 5 Drawing Sheets

COMBINED ELECTRONIC/SILVER-HALIDE IMAGE CAPTURE SYSTEM WITH CELLULAR TRANSMISSION CAPABILITY

This is a Continuation of application Ser. No. 08/353,023, filed Dec. 09, 1994, now abandoned.

FIELD OF THE INVENTION

The present invention relates in general to combined electronic/silver-halide image capture systems. More specifically, the invention relates to an electronic/silver-halide image capture system that is capable of transmitting captured image data via cellular communications transmission.

BACKGROUND

Imaging systems have been proposed that combine both electronic imaging technology and conventional silver-halide photographic film for image capture. U.S. Pat. No. 4,714,962 issued to Levine, for example, discloses a dual electronic camera that permits an image to be captured both electronically and on photographic film. The dual capability of the imaging system permits a user to electronically capture an image for previewing prior to exposing the photographic film, thereby insuring that the subject of interest has been appropriately selected and framed while the event of interest is occurring without having to wait until photographic prints are made. In addition, dual image capture has the benefit of providing a silver-halide image of a scene that is much less susceptible to tampering than stored electronic image data, and can therefore be utilized for archive purposes or as evidence that the electronic image data has not been altered.

Dual electronic/silver-halide image capture systems are particularly useful in news gathering and surveillance operations, where it may be desirable to electronically capture an image for approval prior to creating a photographic exposure. In such cases, the location of the imaging system operator may be remote from the individual charged with approving the image to be captured, and the electronically captured image data must be transmitted to the remote location for preview. In such situations, the silver-halide image may be required in addition to an electronic image to meet evidence, archival storage requirements, or high resolution large format output requirements.

While methods have been developed for transmitting electronic image data to a remote locations using satellite transmission or conventional radio technology, there exists a need for reducing the expense and complexity of the data transmission system in electronic/silver-halide image capture systems.

SUMMARY OF THE INVENTION

The present invention provides a combined electronic/silver-halide image capture system that is capable of transmitting electronic image data using conventional cellular telephone transmission technology. The system includes a camera unit and a cellular telephone that can be electrically coupled to the camera unit or, alternatively, a single module that integrates the camera unit and cellular telephone unit.

The camera unit has both a photographic film plane and an electronic image sensor. A mechanism is provided for directing scene light from a scene to be imaged to at least one of the photographic film plane and the electronic image sensor. The electronic image sensor generates analog image signals in response to incident scene light. A processing unit receives the analog image signals generated by the electronic image sensor and generates digital image signals representative of the scene to be imaged. A memory unit is provided to selectively store the digital image signals generated by the processing unit. The camera unit also preferably includes a display so that the digital image signals generated by the processing means can be viewed by the operator of the system.

The cellular telephone includes transmission/receiving circuitry for transmitting and receiving cellular band signals. A microphone supplies a voice signal to the transmission/receiving circuitry, which transmits the voice signal as a cellular band signal in a conventional manner. A speaker is provided for generating an audible signal in response to a cellular band signal received by the transmission/receiving circuitry in a conventional manner. The cellular telephone preferably includes a voice recognition unit for identifying a voice signal supplied by the microphone means as a voice command, wherein the voice command is utilized to control the operation of at least one of the camera unit and the cellular telephone. Similarly, a voice generation unit is provided to supply a voice message signal to the speaker of the cellular telephone in response to a command signal, wherein the speaker generates an audible voice message in response to the voice message signal.

As was stated above, the camera unit and the cellular telephone can be provided as two separate devices that are electrically coupled via interface connectors. It is preferably, however, that the camera unit and cellular telephone be combined as an integrated module.

Additional advantageous features of the invention are described in the following detailed description of the preferred embodiments of the invention.

BRIEF DESCRIPTION OF THE DRAWINGS

The invention will be described in greater detail with reference to the accompanying drawings, wherein.

DETAILED DESCRIPTION OF THE PREFERRED EMBODIMENTS

Figure 1:
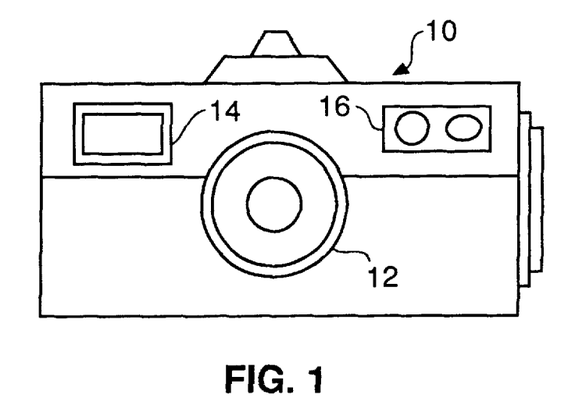
FIG. 1 illustrates a front view of a combined electronic/photographic camera utilized in the imaging system of the invention.
Figure 2:
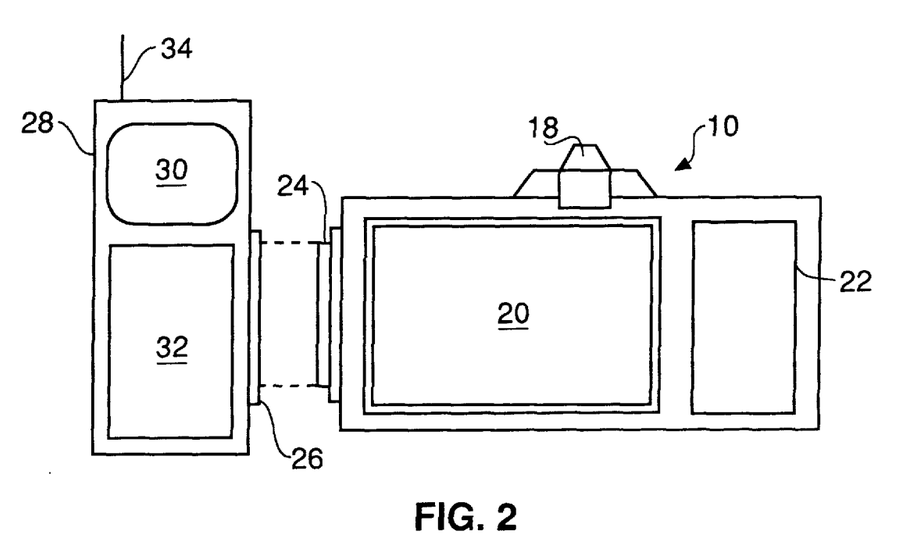
FIG. 2 illustrates a rear view of the camera illustrated in FIG. 1 and a cellular telephone to be utilized in the imaging system of the invention.

FIG. 1 illustrates a front view of a combined electronic/silver-halide camera unit 10 utilized in the imaging system of the invention. The camera unit 10 includes a standard lens system 12, an electronic flash unit 14 and an sensor unit 16, which includes a light sensor and an autofocus sensor. As shown in FIG. 2, a viewfinder 18, a display unit 20, and an operator control interface 22, are located on the back of the camera unit 10. The display unit 20 is preferably a high resolution liquid-crystal-display (LCD). The camera unit 10 includes an interface connector 24 that connects with a corresponding interface connector 26 provided on a cellular telephone 28, thereby permitting the camera unit 10 and cellular telephone 28 to be coupled together and electrically connected. Alternatively, an interface cable (illustrated by dashed lines) can be provided between the interface connectors 24, 26, thereby permitting the cellular telephone 28 to be electrically connected without requiring the physical attachment of the cellular telephone 28 to the camera 10. Still further, the camera 10 and cellular telephone 28 can be equipped with infrared transmitters and receivers (or similar devices), in order to establish a wireless data communications link in place of a physical connection. The cellular telephone 28 includes a conventional LCD display 30, keypad 32, and retractable antenna 34.

Figure 3:
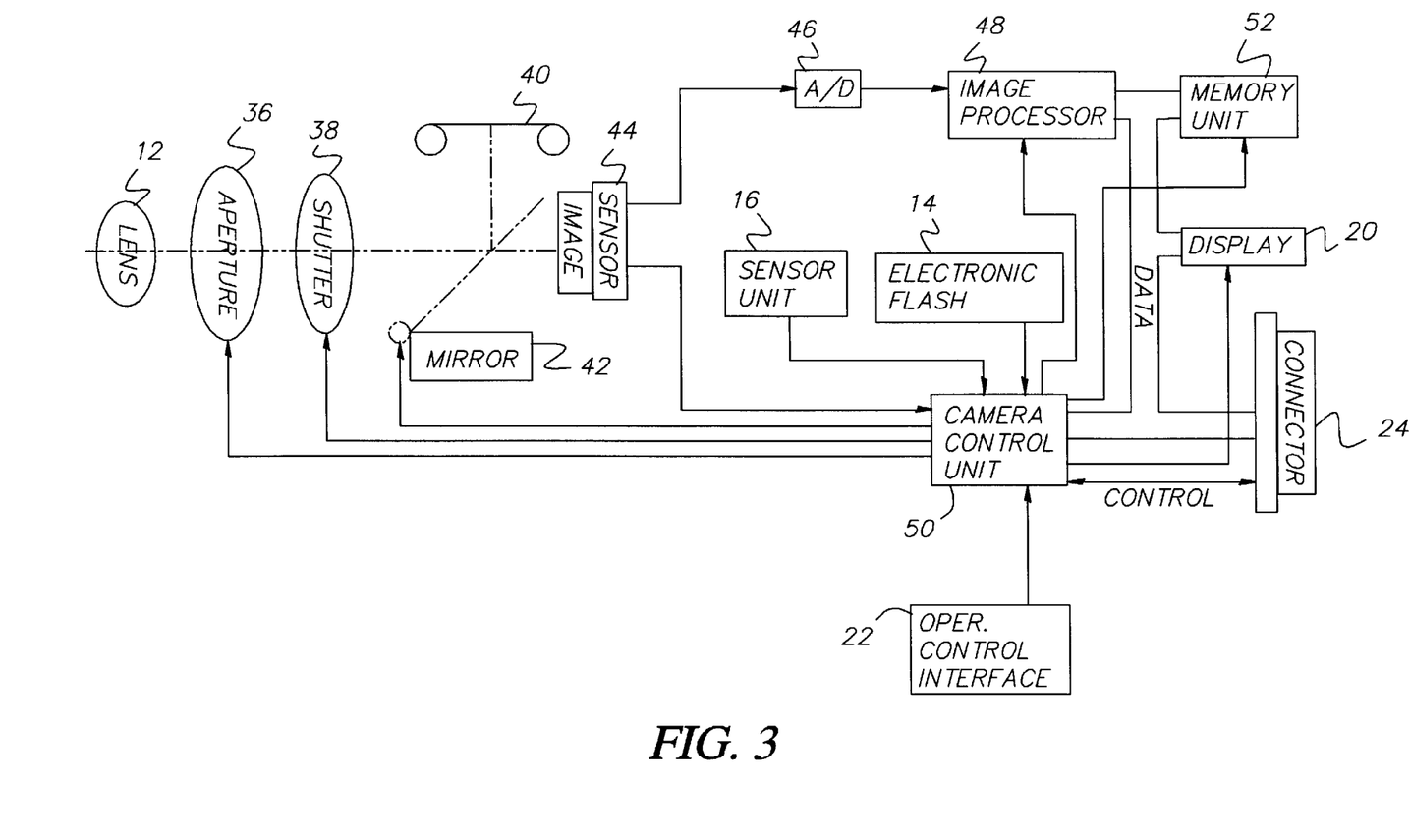
FIG. 3 is a functional block diagram of the camera illustrated in FIGS. 1 and 2.

A functional block diagram of the camera unit 10 is illustrated in FIG. 3. The lens unit 12 images scene light onto an electronic image sensor 44 that is controlled by a camera control circuit 50. The camera control circuit 50 controls the operation of a variable aperture 36 and shutter mechanism 38, in response to an exposure initialization signal supplied from the operator control interface 22 and signals supplied by the sensor unit 16, to provide a proper exposure. The camera control circuit 50 preferably includes a general purpose microprocessor, memory and associated circuitry, although an application specific integrated circuit or discrete hardware components may also be utilized. The electronic image sensor 44 generates an analog output signal that is supplied to a analog-to-digital (A/D) converter 46, which converts the analog output signal into a digital signal that is supplied to image processing circuitry 48. The image processing circuitry 48 performs various processing functions in a conventional manner to generate a digital image signal that can be selectively supplied to the display unit 20 or a memory unit 52. The memory unit 52 preferably includes standard PCMIA interface slots into which removable non-volatile flash EEPROM memory cards (for example RD1001 Memory Cards available from Fuji Microdevice Co., particularly well suited to sound annotated image operations which will be described in greater detail at a later point) can be inserted, although a fixed memory unit may also be utilized. A beam deflection mechanism 42 is provided in the optical path of the camera 10 to deflect incoming scene light to a photographic image plane 40 where a photographic film is loaded. The beam deflecting mechanism 42 may include a movable mirror (as illustrated), a beam splitter, or any other type of mechanism that permits the incoming scene light to either be selectively or simultaneously supplied to the photographic image plane 40 and the electronic image sensor 44. If scene light is simultaneously supplied to both the photographic image plane 40 and the electronic image sensor 44, then separate shuttering mechanisms must be provided to permit selective exposure of either the photographic image plane 40 or the electronic image sensor 44. Alternatively, the photographic image plane 40 and electronic image sensor 44 can be simultaneously exposed. Although not specifically illustrated, an automatic winding mechanism is preferably provided to automatically load and advance the photographic film in a conventional manner. The interface connector 24 is coupled to the camera control circuit 50 and to the memory unit 52, thereby permitting control signals and data to pass between the camera 10 and cellular phone 28.

Figure 4:
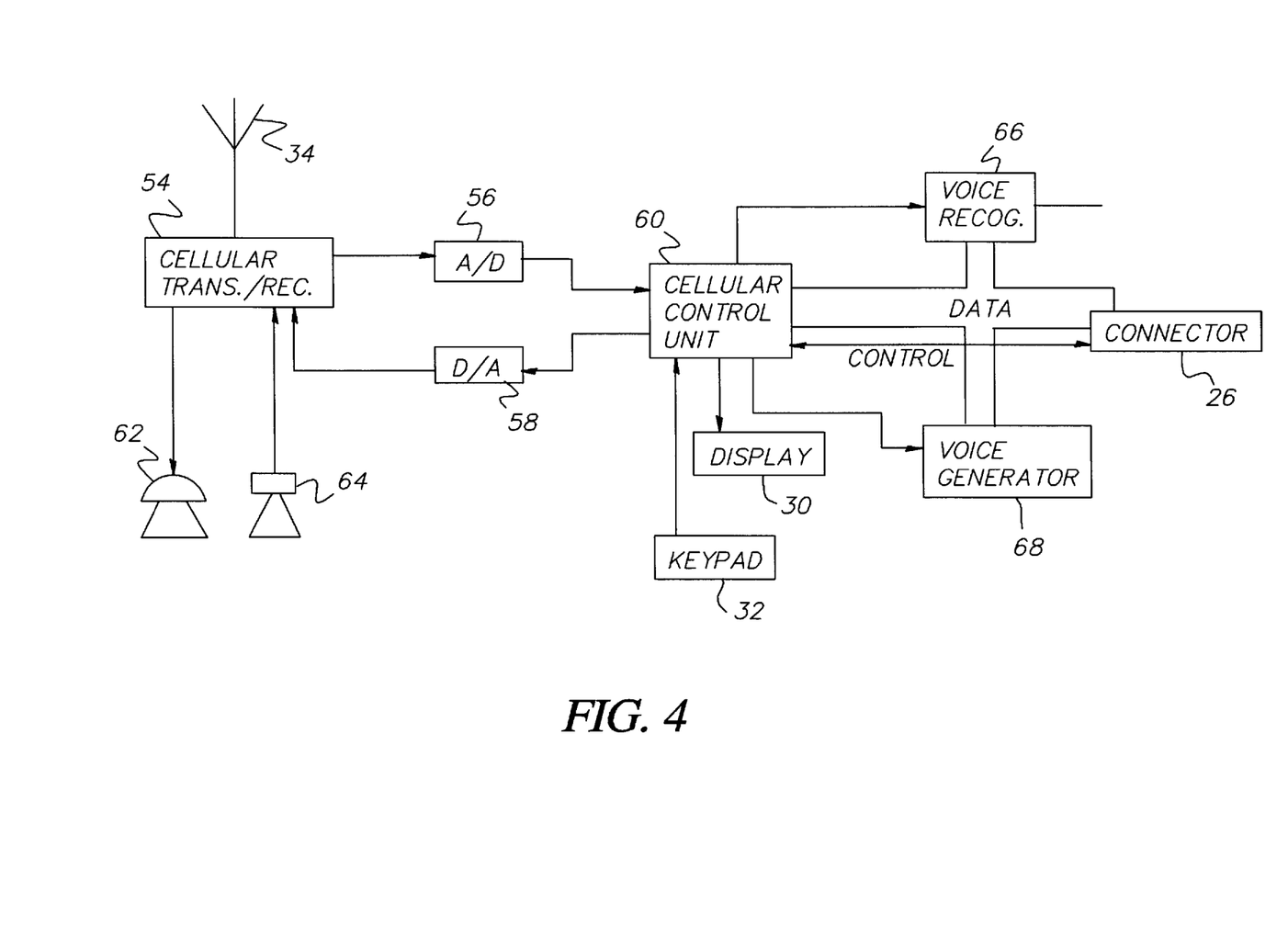
FIG. 4 is a functional block diagram of the cellular telephone illustrated in FIG. 3.

As shown in FIG. 4, the cellular phone 28 includes a cellular transmitter/receiver circuit 54 coupled to the antenna 34. Cellular band voice transmission signals received by the transmitter/receiver circuit 54 are supplied to a speaker 62 in a conventional manner. Similarly, a microphone 64 is coupled to the transmitter/receiver circuit 54 in a conventional manner to enable cellular band transmission of voice signals to remote locations. Operation of the transmitter/receiver circuit 54 is controlled by a cellular control unit 60 (incorporating a microprocessor, application specific integrated circuit and/or discrete components) that is also coupled to the display 30 and the keypad 32. An A/D converter 56 and a D/A converter 58 are provided to permit analog signals received by the transmitter/receiver circuit 54 from the speaker 62 or antenna 34 to be converted to digital signals and supplied to the cellular control unit 60, and to permit digital data supplied from the cellular control unit 60 to be converted to an analog signal for transmission by the transmitter/receiver circuit 54. The display 30 is used to display various messages to the operator of the telephone as is readily known in the art. A voice recognition unit 66 is also preferably included to permit voice control of the cellular phone 28. An operator speaks into the speaker 62 and the signal generated by the speaker 62 is digitized and supplied to the voice recognition unit 66. The voice recognition unit 66 processes the digitized signal to identify a voice command. A signal representative of the voice command is then supplied to the cellular control circuit 60, which controls the operation of the cellular telephone 28 accordingly. Thus, the cellular telephone 28 can be controlled either by voice command or by entering data via the keypad 32. In addition, the operator of the camera 10 can also be controlled by transmitting the signals representative of the voice command to the camera control unit 50 when the cellular telephone 28 is electrically coupled to the camera 10.

Similarly, the cellular telephone 28 is provided with a voice generator 68, that generates a digital signal representative of human speech in response to data supplied by the cellular control circuit 60. The digital signal is converted to an analog signal by the D/A 58 and supplied to the speaker 62, wherein the operator is provided with audible voice messages indicative of various operating conditions of the cellular telephone 28. Thus, messages can be communicated to the operator either by the display 30 or through the use of the voice generator 68. As with the voice recognition unit 66, the voice generator 68 can also be utilized to generate audible voice messages based on data supplied by the camera control circuit 50 when the cellular telephone 28 is coupled to the camera 10.

Figure 5:
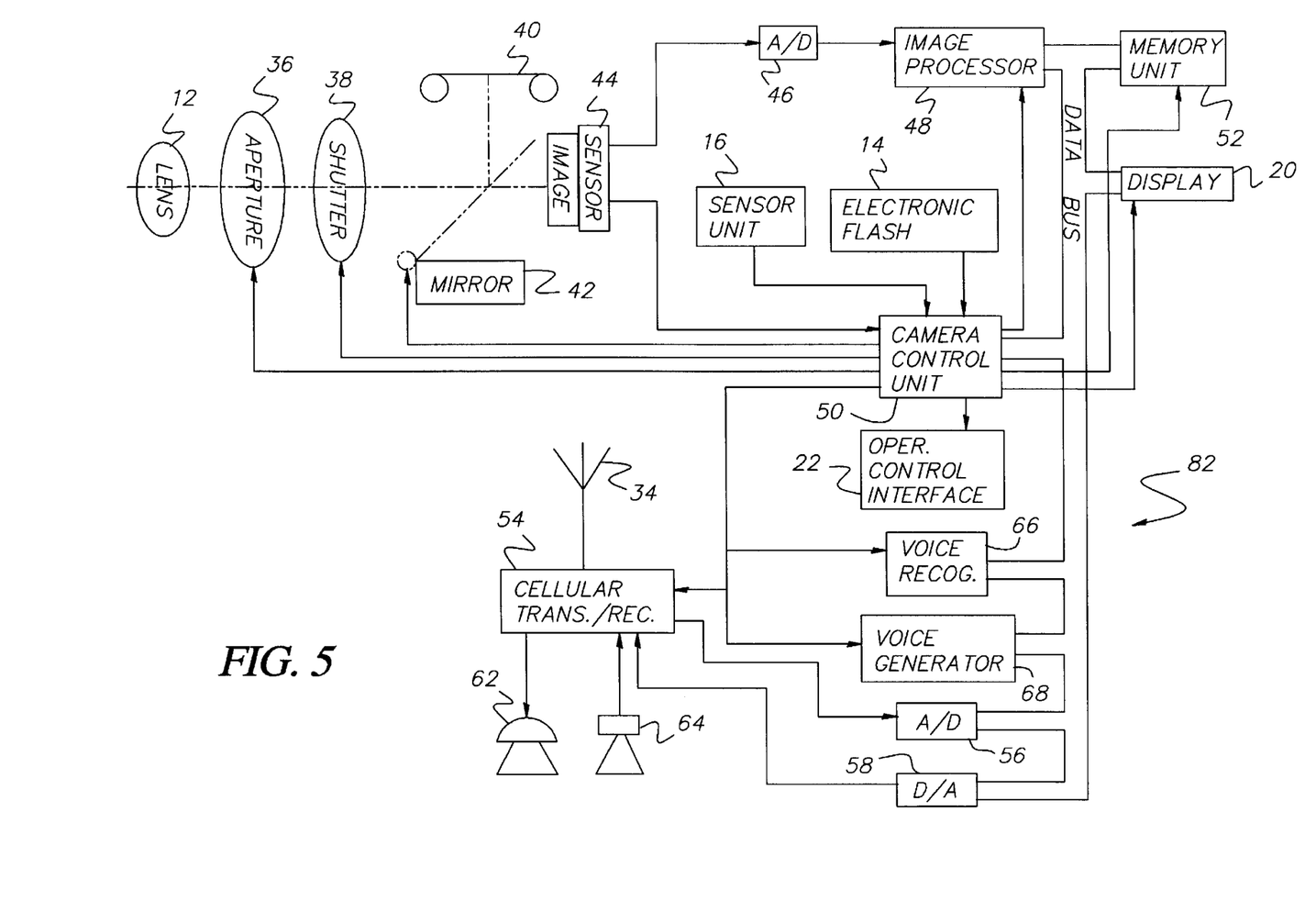
FIG. 5 illustrates a further embodiment of the invention wherein the camera and cellular telephone are combined as a single unit.

Although the embodiment illustrated in FIGS. 1 and 2 show the cellular telephone 28 as being a separate unit from the camera 10, it will be understood that the two separate units may be readily combined within a single housing as an integrated module. FIG. 5 illustrates a functional block diagram of a combined camera/telephone module 82 or integrated electronic/silver-halide image capture system in accordance with a second embodiment of the invention. The combined camera/telephone module 82 includes the same basic components as the embodiment illustrated in FIGS. 3 and 4, although the separate camera control circuit 50 and cellular control circuit 60 is combined into a single central control unit 70. In addition, the keypad 32 of the cellular telephone 28 is combined with the operator control interface 22 of the camera 10, such that a single operator control interface 22' is provided. The functions of the display 20 of the camera 10 and the display 30 of the cellular telephone 28 are also combined in a similar manner into a single display 20'.

A typical operating scenario for the illustrated system will now be described. The operator initiates an image capture mode using a mode selector provided on the operator control interface 22 of the camera 10. Assuming previewing is desired, the operator selects an electronic image capture mode to command the camera control unit 50 to initiate operation of the aperture 34, shutter 36 and electronic image sensor 44 to electronically capture a scene to be imaged. The analog output signal from the electronic image sensor 44 is converted to a digital signal by the A/D converter 46 and supplied to the image processing circuit 48. The digital image signal generated from the image processing circuit 48 is preferably simultaneously supplied to the display 20 and the memory unit 52. The operator views the captured image on the display 20 to determine if the subject is properly framed and exposed. If the captured image is not acceptable, the operator can erase the image from the memory unit 26 by activating an erase button (not shown) on the operator control interface 22 to send an erase command signal to the camera control unit 50. If the captured image is acceptable, the operator may switch to a photographic mode using the mode selector to capture the subject on photographic film loaded in the photographic film plane 40. The camera control unit 50 controls the operation of the beam deflection mechanism 42 to direct the scene light onto the photographic image plane 40 and initiates an exposure operation.

In the event that the operator wishes to have the electronic image previewed at a remote location, the operator, after first attaching the cellular phone 28 to the camera 10 via interface connector 24 and interface connector 26 if separate devices are utilized, initiates a telephone call to the remote location by dialing the appropriate number on the keypad 32 or alternatively by entering a voice command via the microphone 64. The cellular phone 28 establishes a communication link with the remote location, for example by using conventional modem communication protocols, and a message indicating that the remote location is ready to receive is displayed on the display 30 of the cellular phone 28 and/or an audible voice message is generated by the voice generator 68 over the speaker 62. The operator activates an image transmission selector on the operator control interface 22 of the camera unit 10 to command the camera control unit 50 to download the digital image signal stored in the memory unit 52 to the cellular phone 28 for transmission over the established communications link. After transmission is complete, the operator can detach the cellular phone 28 from the camera 10 and establish voice communications with the remote location. If the electronic image transmitted to the remote location is deemed to be acceptable, the operator proceeds with a photographic imaging operation if desired to capture the subject on photographic film.

It will be understood that the operating scenario presented above is simply intended to illustrate the operation of the invention, and other operating modes are possible. For example, the digital image signals stored in the memory unit 52 can be transmitted via the cellular phone 28 either before or after the completion of a photographic exposure operation. In addition, the operator may not wish to capture each subject both electronically and photographically, but instead, may be captured as only an electronic image or a photographic image if desired.

The combination of both image capture and cellular phone structures provides a number of unique advantages that cannot be obtained using independent devices. For example, the microphone 64 of the cellular phone can be utilized to provide voice or sound annotation of images captured by the camera 10. In such a situation, the operator selects a sound annotation mode from a selector provided on the operator control interface 22 and speaks into the microphone 64 of the cellular phone 28. The signals from the microphone are digitized and supplied to the memory unit 52, where they are indexed by the camera control circuit 50 to a corresponding electronic image or photographic image captured by the camera 10. In addition, the display 20 can be utilized to display an image of a calling party when the operator is using the cellular phone 28, and an image of the operator taken by the camera 10 can be transmitted to the calling party, thereby providing a video conferencing capability.

Figure 6:
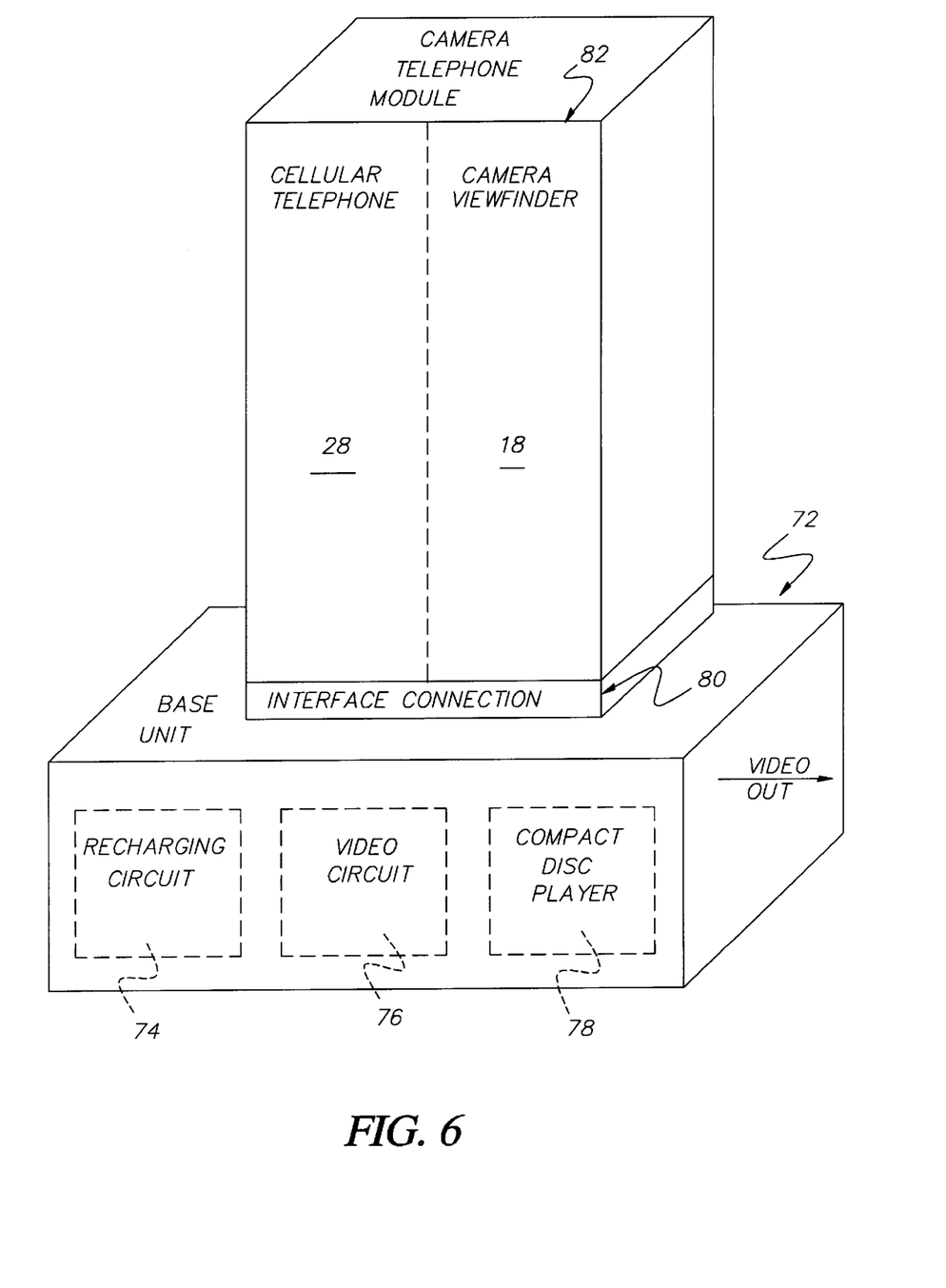
FIG. 6 illustrates a further embodiment of the invention that includes a base unit.

In a further embodiment of the invention illustrated in FIG. 6, at least one of the camera 10 and the cellular telephone 28 (if separate units are utilized as illustrated by the dotted line) or the combined camera/telephone module 82 (if the camera and cellular telephone are provided as an integrated module) is provided with an interface connector 80 that couples to a base unit 72. The base unit 72 includes recharging circuitry 74 for recharging batteries (not shown) contained in the camera 10 and the cellular telephone 28 or the camera/telephone module 82. In addition, the base unit 72 includes video circuitry 76 for converting the digital image signals stored in the memory unit 52 of the camera unit 10 into a video signal (either a standard television signal or other video format signal) for display on a television or monitor that can be coupled to the base unit 72. Alternatively, the base unit 72 includes a compact disc (CD) drive 78 that permits the digital image data stored in the memory 52 to be downloaded to a CD. Alternatively, the interface 80 can be used to couple the combined camera/telephone module 82, camera 10 or cellular telephone 28 to a device other than the base unit 72, for example, a computer.

The invention has a number of advantages over conventional single imaging systems. For example, photographic images taken in conjunction with electronic images can be used to prove that the electronic images have not been altered. In addition, the electronic images can be used for remote verification and approval, while the photographic images enable large enlargements to be made from high resolution negatives for magazines, posters and professional publishing applications.

The invention has been described with reference to certain preferred embodiments thereof. It will be understood, however, that modifications and variations are possible within the scope of the appended claims. For example, the cellular telephone 28 can be integrated with the base unit 72 and built into a console of an automobile, a television set or a video recorder unit. In such a case, the camera unit 10 would contain an interface connector to couple to the base unit. The cellular communication functions of the invention may be provided by a wireless modem card (for example, Personal Messenger™ 100D available from Motorola) that can be inserted into the PCMIA slot of the memory unit 52. In addition, the memory unit 52 is a read-only-memory, in a further preferred embodiment of the invention, to ensure the integrity of the electronic image data being stored and therefore provide a further safeguard against manipulation of the electronic image data. Finally, the camera control unit 50 or central control unit 70 preferably provides an editing function to allow multiple images to be retrieved from the memory unit 52 and combined as a single image and individual images to be cropped prior to transmission.

INDUSTRIAL UTILITY

The invention provides a combined electronic/silver-halide image capture system with cellular transmission capability that is useful in capturing images in both electronic form and with conventional photographic film, and transmitting the images captured in electronic form to remote locations.

REFERENCE NUMERALS

10 Camera Unit
12 Lens System
14 Electronic Flash Unit
16 Sensor Unit
18 Viewfinder
20 Display Unit
20' Combined Display
22 Operator Control Interface
22' Combined Operator Control Interface
24 Interface Connector
26 Interface Connector
28 Cellular Telephone
30 Display
32 Keypad
34 Antenna
36 Aperture
38 Shutter Mechanism
40 Photographic Image Plane
42 Beam Deflection Mechanism
44 Electronic Image Sensor
46 A/D Converter
48 Image Processing Circuitry
50 Camera Control Unit
52 Memory Unit
54 Transmitter/Receiver Circuit
56 A/D Converter
58 D/A Converter
60 Cellular Control Unit
62 Speaker
64 Microphone
66 Voice Recognition Unit
68 Voice Generator
70 Central Control Unit
72 Base Unit
74 Recharging Circuitry
76 Video Circuitry
78 Compact Disc Unit
80 Interface Connector
82 Camera/Telephone Module

What is claimed:

1. An electronic/silver-halide image capture system with cellular transmission capability comprising:

a camera unit including a photographic film plane and an electronic image sensor, exposure means for directing scene light from a scene to be imaged to at least one of the photographic film plane and the electronic image sensor, wherein the electronic image sensor generates an analog image signal in response to incident scene light, processing means for receiving the analog image signal generated by the electronic image sensor and generating a digital image signal representative of the scene to be imaged, memory means for selectively storing the digital image signal generated by the processing means, and camera control means for controlling the operation of the electronic image sensor, the exposure means, the processing means and the memory means;

a cellular telephone including transmission/receiving means for transmitting and receiving cellular band signals; microphone means for supplying a voice signal to the transmission/receiving means which transmits the voice signal as a cellular band signal, speaker means for generating an audible signal in response to a cellular band signal received by the transmission/receiving means, and cellular control means for controlling the operation of the transmission/receiving means; and coupling means for electrically coupling the camera unit to the cellular telephone, wherein the digital image signal stored in the memory means is supplied to the transmission/receiving means of the cellular telephone for transmission as a cellular band signal to a remote location and wherein the coupling means comprises a first interface connector located on the camera unit and a second interface connector locating on the cellular telephone, wherein the first interface connector mates directly to the second interface connector.

2. An electronic/silver-halide image capture system as claimed in claim 1, wherein the camera unit further comprises a display means for selectively displaying the digital image signal generated by the processing means.

3. An electronic/silver-halide image capture system as claimed in claim 1, wherein the coupling means comprises a first interface connector located on the camera unit, a second interface connector located on the cellular telephone, and an interface cable connecting the first and second interface connectors.

4. An electronic/silver-halide image capture system as claimed in claim 1, wherein the cellular telephone further comprises voice generation means for supplying a voice message signal to the speaker means of the cellular telephone in response to a command signal supplied by at least one of the camera control means and the cellular control means, wherein the speaker means generates an audible voice message in response to the voice message signal.

5. An electronic/silver-halide image capture system as claimed in claim 1, further comprising a base unit that interfaces to at least one of the camera unit and the cellular telephone.

6. An electronic/silver-halide image capture system as claimed in claim 5, wherein the base unit includes video processing circuitry that converts the digital image signal stored in the memory means of the camera unit into a video signal.

7. An electronic/silver-halide image capture system as claimed in claim 6, wherein the base unit includes a compact disc drive that transfers the digital image signal stored in the memory means of the camera unit to a compact disc.

8. An electronic/silver-halide image capture system as claimed in claim 1, wherein the memory means comprises a read-only-memory.

9. An electronic/silver-halide image capture system as claimed in claim 1, wherein the camera control means includes means for editing the digital image signal stored in the memory means.

10. An electronic/silver-halide image capture system with cellular transmission capability comprising:

a camera unit including a photographic film plane and an electronic image sensor, exposure means for directing scene light from a scene to be imaged to at least one of the photographic film plane and the electronic image sensor, wherein the electronic image sensor generates an analog image signal in response to incident scene light, processing means for receiving the analog image signal generated by the electronic image sensor and generating a digital image signal representative of the scene to be imaged, memory means for selectively storing the digital image signal generated by the processing means, and camera control means for controlling the operation of the electronic image sensor, the exposure means, the processing means and the memory means;

a cellular telephone including transmission/receiving means for transmitting and receiving cellular band signals; microphone means for supplying a voice signal to the transmission/receiving means which transmits the voice signal as a cellular band signal, speaker means for generating an audible signal in response to a cellular band signal received by the transmission/receiving means, and cellular control means for controlling the operation of the transmission/receiving means, wherein the cellular telephone further comprises a voice recognition means for identifying a voice signal supplied by the microphone means as voice command, and for supplying a voice command signal to at least one of the cellular control means and the camera control means, wherein the cellular control means and the camera control means respectively control the operation of the cellular telephone and the camera unit based on the voice command signal; and coupling means for electrically coupling the camera unit to the cellular telephone, wherein the digital image signal stored in the memory means is supplied to the transmission/receiving means of the cellular telephone for transmission as a cellular band signal to a remote location.

11. An electronic/silver-halide image capture system with cellular transmission capability comprising:

a camera unit including a photographic film plane and an electronic image sensor, exposure means for directing scene light from a scene to be imaged to at least one of the photographic film plane and the electronic image sensor, wherein the electronic image sensor generates an analog image signal in response to incident scene light, processing means for receiving the analog image signal generated by the electronic image sensor and generating a digital image signal representative of the scene to be imaged, memory means for selectively storing the digital image signal generated by the processing means, and camera control means for controlling the operation of the electronic image sensor, the exposure means, the processing means and the memory means and wherein the camera unit further comprises a display means for selectively displaying the digital image signal generated by the processing means;

a cellular telephone including transmission/receiving means for transmitting and receiving cellular band signals; microphone means for supplying a voice signal to the transmission/receiving means which transmits the voice signal as a cellular band signal, speaker means for generating an audible signal in response to a cellular band signal received by the transmission/receiving means, and cellular control means for controlling the operation of the transmission/receiving means, wherein the transmission/receiving means of the cellular telephone receives a cellular band signal representative of an image of a calling party and supplies the signal representative of the image of the calling party to the display means of the camera unit; and coupling means for electrically coupling the camera unit to the cellular telephone, wherein the digital image signal stored in the memory means is supplied to the transmission/receiving means of the cellular telephone for transmission as a cellular band signal to a remote location.

12. An electronic/silver-halide image capture system with cellular transmission capability comprising:

a camera unit including a photographic film plane and an electronic image sensor, exposure means for directing scene light from a scene to be imaged to at least one of the photographic film plane and the electronic image sensor, wherein the electronic image sensor generates an analog image signal in response to incident scene light, processing means for receiving the analog image signal generated by the electronic image sensor and generating a digital image signal representative of the scene to be imaged, memory means for selectively storing the digital image signal generated by the processing means, and camera control means for controlling the operation of the electronic image sensor, the exposure means, the processing means and the memory means;

a cellular telephone including transmission/receiving means for transmitting and receiving cellular band signals; microphone means for supplying a voice signal to the transmission/receiving means which transmits the voice signal as a cellular band signal, speaker means for generating an audible signal in response to a cellular band signal received by the transmission/receiving means, and cellular control means for controlling the operation of the transmission/receiving means, wherein the cellular telephone includes a digital-to-analog converter, and a voice signal supplied from the microphone means is converted by the digital-to-analog converter into a digital sound signal that corresponds to an image captured by the electronic/silver-halide image capture system which is stored in the memory means of the camera unit; and coupling means for electrically coupling the camera unit to the cellular telephone, wherein the digital image signal stored in the memory means is supplied to the transmission/receiving means of the cellular telephone for transmission as a cellular band signal to a remote location.

13. An integrated electronic/silver-halide image capture system with cellular transmission capability comprising:

a photographic film plane and an electronic image sensor;

exposure means for directing scene light from a scene to be imaged to at least one of the photographic film plane and the electronic image sensor, wherein the electronic image sensor generates an analog image signal in response to incident scene light;

processing means for receiving the analog image signal generated by the electronic image sensor and generating a digital image signal representative of the scene to be imaged;

memory means for selectively storing the digital image signal generated by the processing means;

a cellular transmission/receiving means for transmitting and receiving cellular band signals;

microphone means for supplying a voice signal to the transmission/receiving means which transmits the voice signal as a cellular band signal;

speaker means for generating an audible signal in response to a cellular band signal received by the transmission/receiving means;

a voice recognition means for identifying a voice signal, representative of a voice command, that is supplied by the microphone means, and for supplying a voice command signal to the control means, wherein the control means controls the operation of the electronic/silver-halide image capture system based on the voice command signal and control means for controlling the operation of the electronic image sensor, the exposure means, the processing means, the memory means, and the transmission/receiving means;

wherein the digital image signal stored in the memory means is supplied to the transmission/receiving means for transmission as a cellular band signal to a remote location.

14. An electronic/silver-halide image capture system as claimed in claim 13, further comprising a display means for selectively displaying the digital image signal generated by the processing means.

15. An electronic/silver-halide image capture system as claimed in claim 13, further comprising voice generation means for supplying a voice message signal to the speaker means in response to a command signal supplied by the control means, wherein the speaker means generates an audible voice message in response to the voice message signal.

16. An electronic/silver-halide image capture system as claimed in claim 13, further comprising a base unit.

17. An electronic/silver-halide image capture system as claimed in claim 16, wherein the base unit includes video processing circuitry that converts the digital image signal stored in the memory means into a video output signal.

18. An electronic/silver-halide image capture system as claimed in claim 16, wherein the base unit includes a compact disc drive that transfers the digital image signal stored in the memory means of the camera unit to a compact disc.

19. An electronic/silver-halide image capture system as claimed in claim 13, wherein the memory means comprises a read-only-memory.

20. An electronic/silver-halide image capture system as claimed in claim 13, wherein the camera control means includes means for editing the digital image signal stored in the memory means.

21. An integrated electronic/silver-halide image capture system with cellular transmission capability comprising:

a photographic film plane and an electronic image sensor;

exposure means for directing scene light from a scene to be imaged to at least one of the photographic film plane and the electronic image sensor, wherein the electronic image sensor generates an analog image signal in response to incident scene light;

processing means for receiving the analog image signal generated by the electronic image sensor and generating a digital image signal representative of the scene to be imaged;

memory means for selectively storing the digital image signal generated by the processing means;

a cellular transmission/receiving means for transmitting and receiving cellular band signals;

microphone means for supplying a voice signal to the transmission/receiving means which transmits the voice signal as a cellular band signal;

speaker means for generating an audible signal in response to a cellular band signal received by the transmission/receiving means;

a display means for selectively displaying the digital image signal generated by the processing means;

control means for controlling the operation of the electronic image sensor, the exposure means, the processing means, the memory means, and the transmission/receiving means;

wherein the digital image signal stored in the memory means is supplied to the transmission/receiving means for transmission as a cellular band signal to a remote location; and wherein the transmission/receiving means receives a cellular band signal representative of an image of a calling party and supplies the signal representative of the image of the calling party to the display means of the camera unit.

22. An integrated electronic/silver-halide image capture system with cellular transmission capability comprising:

a photographic film plane and an electronic image sensor;

exposure means for directing scene light from a scene to be imaged to at least one of the photographic film plane and the electronic image sensor, wherein the electronic image sensor generates an analog image signal in response to incident scene light;

processing means for receiving the analog image signal generated by the electronic image sensor and generating a digital image signal representative of the scene to be imaged;

memory means for selectively storing the digital image signal generated by the processing means;

a cellular transmission/receiving means for transmitting and receiving cellular band signals;

microphone means for supplying a voice signal to the transmission/receiving means which transmits the voice signal as a cellular band signal;

speaker means for generating an audible signal in response to a cellular band signal received by the transmission/receiving means;

control means for controlling the operation of the electronic image sensor, the exposure means, the processing means, the memory means, and the transmission/receiving means;

wherein the digital image signal stored in the memory means is supplied to the transmission/receiving means for transmission as a cellular band signal to a remote location; and a digital-to-analog converter, wherein a voice signal supplied from the microphone means is converted by the digital-to-analog converter into a digital sound signal that corresponds to an image captured by the electronic/silver-halide image capture system, and wherein the digital sound signal is stored in the memory means of the camera unit.

23. An electronic image capture system with cellular transmission capability comprising:

a camera unit including an electronic image sensor, exposure means for directing scene light from a scene to be imaged to the electronic image sensor, wherein the electronic image sensor generates an analog image signal in response to incident scene light, processing means for receiving the analog image signal generated by the electronic image sensor and generating a digital image signal representative of the scene to be imaged, memory means for selectively storing the digital image signal generated by the processing means, and camera control means for controlling the operation of the electronic image sensor, the exposure means, the processing means and the memory means;

a cellular telephone including transmission/receiving means for transmitting and receiving cellular band signals; microphone means for supplying a voice signal to the transmission/receiving means which transmits the voice signal as a cellular band signal, speaker means for generating an audible signal in response to a cellular band signal received by the transmission/receiving means, cellular control means for controlling the operation of the transmission/receiving means, and a voice recognition means for identifying a voice signal supplied by the microphone means as a voice command, and for supplying a voice command signal to both the cellular control means and the camera control means, wherein the cellular control means and the camera control means respectively control the operation of the cellular telephone and the camera unit based on the voice command signal; and coupling means for electrically coupling the camera unit to the cellular telephone, wherein the digital image signal stored in the memory means is supplied to the transmission/receiving means of the cellular telephone for transmission as a cellular band signal to a remote location.

24. An electronic image capture system as claimed in claim 23, wherein the camera unit further comprises a display means for selectively displaying the digital image signal generated by the processing means.

25. An electronic image capture system as claimed in claim 23, wherein the coupling means comprises a first interface connector located on the camera unit and a second interface connector locating on cellular telephone, wherein the first interface connector mates directly to the second interface connector.

26. An electronic image capture system as claimed in claim 23, wherein the coupling means comprises a first interface connector located on the camera unit, a second interface connector located on the cellular telephone, and an interface cable connecting the first and second interface connectors.

* * * * *